United States Patent
Itoh

[15] 3,707,722
[45] Dec. 26, 1972

[54] IMPACT ACCELERATION RECORDING DEVICE

[72] Inventor: Kazu Itoh, No. 14-30 Sakuragaoka 4-chome, Setagaya-ku, Tokyo, Japan

[22] Filed: Oct. 5, 1971

[21] Appl. No.: 186,751

[52] U.S. Cl....................346/7, 73/492, 116/114 AH
[51] Int. Cl............................................G01p 15/04
[58] Field of Search............346/7, 111; 73/489, 492; 116/114 AH

[56] References Cited

UNITED STATES PATENTS 3,218,870  11/1965  Baker....................................346/7 X

*Primary Examiner*—Joseph W. Hartary
*Attorney*—Richard C. Sughrue et al.

[57] ABSTRACT

A weight disc has a wedge-like perimeter and is held between and by the inner edges of thin annular plates of plastic material in coaxial laminated state, the outer edges of the plates being fixedly held by an outer case which is secured to an object subject to possible impact. The disc responds to such impact by shifting from its original position to an impact position, its wedge-like perimeter driving into and along the interfacial seam between the plates to deform the same apart. The distance of the shifting of the disc is measured and referred to previously obtained data to determine the acceleration due to impact.

10 Claims, 6 Drawing Figures

FIG. 3
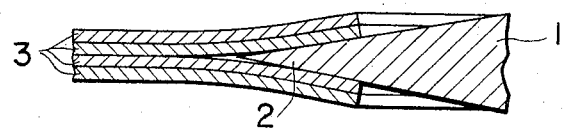
FIG. 5
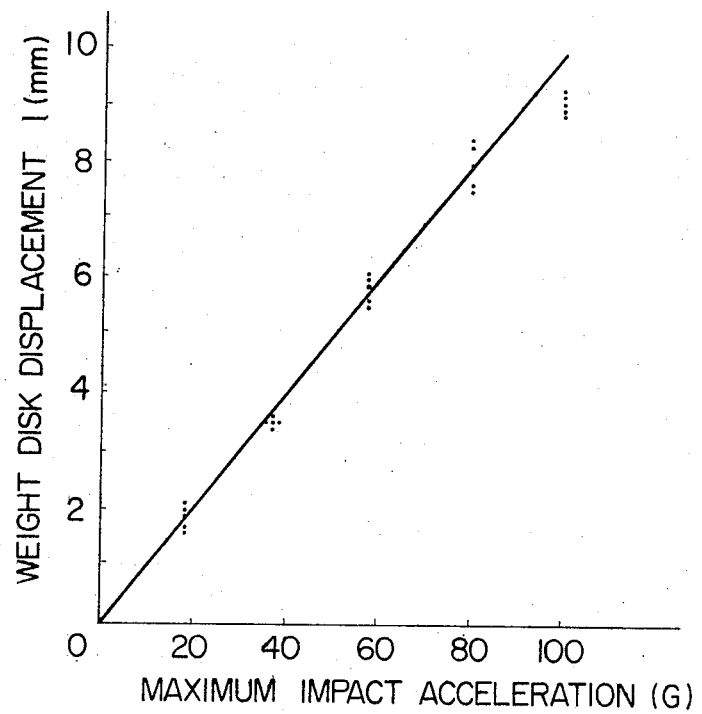
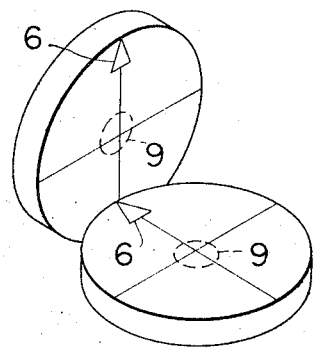
FIG. 6

3,707,722

IMPACT ACCELERATION RECORDING DEVICE

BACKGROUND OF THE INVENTION

1. Field of the Invention

This invention relates generally to impact measuring and recording means and more particularly to an original and advanced device for detecting and recording impact, which device can be conveniently secured to or installed in an article or structure subject to the possibility of receiving impact acceleration.

2. Description of the Prior Art

In various fields there has been a great need for some means for determining the degree or magnitude of maximum impact acceleration in instances such as incidents of dropping of packaged articles onto the ground or other structures and collisions such as those of motor vehicles. However, the manufacture of an accurate and reliable instrument of simple and inexpensive organization and installation which can satisfy this need has been difficult, and no such known instrument has heretofore been successfully produced.

One reason for this difficulty is that the operation of detecting and recording the maximum value together with its direction, of an acceleration which is produced in a very short time and undergoes a complicated variation, itself, is extremely difficult. Another reason is that, ordinarily, measurements of impact acceleration are desired with respect to a large number of articles, and the possibility of occurrence of impact is distributed over this large number of articles. Accordingly, unless the impact detecting and recording instrument or device is made inexpensively and attached in or on each article, the impact accelerations resulting from instances of dropping or of collision, which occur accidently and relatively infrequently, cannot be effectively detected and recorded.

SUMMARY OF THE INVENTION

It is an object of this invention to fulfil the aforementioned need by providing an impact acceleration recording device which is not accompanied by the above described difficulties.

More specifically, an object of this invention is to provide an effective impact acceleration recording device which:

1. is capable of detecting and recording the maximum acceleration in two-dimensional directions of impact, that is, in any direction in a single plane;
2. is capable of effecting and preserving a recording of a maximum acceleration within the range of from 5G to 100G, which is ordinarily problematic;
3. can, itself, be secured to an article in a very simple manner by means such as an adhesive;
4. has an extremely simple construction and organization which, moreover, requires no energy source such as a dry cell battery or a spring; and
5. can be produced on a quantity (mass) production scale to sell at a low price.

The ultimate object of the invention is to provide an impact acceleration recording device of the above stated character which, when installed extensively in packages of goods and in vehicles and the like, will contribute substantially to the solving of questions and problems relating to mishandling of packages and to accidents in which vehicles and the like are involved.

According to this invention, briefly summarized, there is provided an impact acceleration recording device characterized by a weight disc constituting an inertia reactor and having a thickness progressively decreasing radially outward to a sharp wedge-like perimeter, at least two thin annular plates of plastic material disposed in mutually coaxial laminated state and having circular inner edges clamping from opposite sides the wedge-like perimeter of the weight disc and thus holding the weight disc in an original position coaxial with the plates, and a case fixedly holding the outer peripheral parts of the plates and enclosing the disc and the plates, the weight disc responding to an impact acceleration component imparted to the case in a direction parallel to the annular plates to shift from the original position to an indication position as its wedge-like perimeter forcibly advances into and along the interfacial seam between the plates and thereby deforms the plates apart, the distance between the original and the indication positions being indicative of the magnitude of the impact acceleration component.

The nature, principle, and utility of this invention will be more clearly apparent from the following detailed description with respect to a preferred embodiment of the invention when read in conjunction with the accompanying drawings, in which like parts are designated by like reference numerals.

BRIEF DESCRIPTION OF THE DRAWINGS

FIG. 3 is an enlarged fragmentary sectional view showing the part enclosed within the dotted-like circle III in FIG. 2.

FIG. 5 is a graph based on measured results for determining values of maximum impact acceleration from recorded indications (weight disc displacements) of the device.

FIG. 6 is a perspective view showing the particular case where two of the impact acceleration recording devices of the invention are combined and installed in a mutually perpendicular state for three-dimensional measurement in two mutually perpendicular directions.

DETAILED DESCRIPTION

Figure 1:
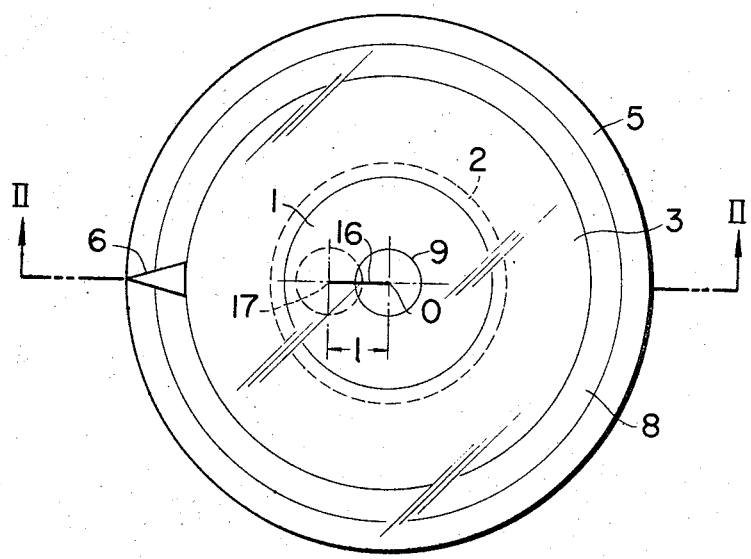
FIG. 1 is a planar view showing one example of an impact acceleration recording device according to this invention.

Referring to the drawings, the example illustrated therein of the impact acceleration recording device according to the invention comprises, essentially, a circular weight disc 1 constituting an inertia reactor and having a sharp wedge-like peripheral edge 2, a plurality of thin annular plates 3,3 made of a plastic material and clamping around their inner edge parts, the peripheral edge 2 of the disc 1, thereby supporting and holding the disc 1, a transparent cylindrical case 4 accommodating the disc 1 and the annular plates 3,3 and having a closed bottom and an open top, and a transparent cover plate 5 covering and closing the open top of the case 4. The cover plate 5 has inscribed on its outer surface an arrow mark 6 for indicating an installation reference direction.

The weight disc 1 has a peripheral flange, part of the shape, in sectional configuration being in the form of two identical frustums of a cone joined coaxially base-to-base and a central cylindrical boss 9 projecting outwardly somewhat from the outer truncated faces of the frustums. The bases of the conical frustums form at their intersection the aforementioned sharp circular edge 2, whereby the disc 1 has a shape with two wedge-like ends in sections taken in planes through the disc centerline.

Figure 2:
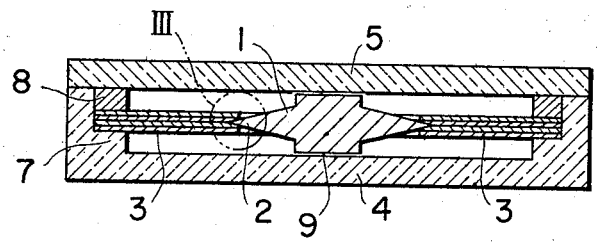
FIG. 2 is a sectional view taken along a plane II—II passing through the center of the device shown in FIG. 1 perpendicularly to the plane of the device, the device being shown in its as-installed state before operation.

For the thin annular plates 3,3 in the illustrated example, four annealed aluminum plates in laminated, coaxial arrangement are used, two plates being disposed above the edge 2 of the weight disc 1 and other two plates being disposed therebelow as viewed in FIG. 2. The case 4 and cover plate 5 are made of a transparent material such as glass or a synthetic resin. The case 4 has around its interior an annular shoulder or ledge 7 on which the outer peripheral part of the stack of the annular plates 3,3 rests and it held thereagainst by a spacer ring 8 held in turn by the cover plate 5.

The weight disc is further provided through its boss 9 with an axial hole 10, in which are placed a spring 12 and steel balls 11 and 13 abuttingly in contact with opposite ends of the spring 12, which thereby urges the steel balls 11 and 13 outward and against the inner surfaces of the case 4 and the cover plate 5, respectively. For recording, these inner surfaces are coated beforehand with an inscribable material such as layers of paint 14 and 15, for example.

The operation of the impact acceleration recording device of the above described organization according to this invention will now be described with respect to an example of its application for determining the maximum impact acceleration occurring in a collision of a motor vehicle.

First, the device of this invention is secured by means such as an adhesive to a structural member near the central part of the vehicle near its floor board, the reference direction arrow mark 6 on the cover plate 5 being aligned with the direction of travel of the vehicle.

Figure 4:
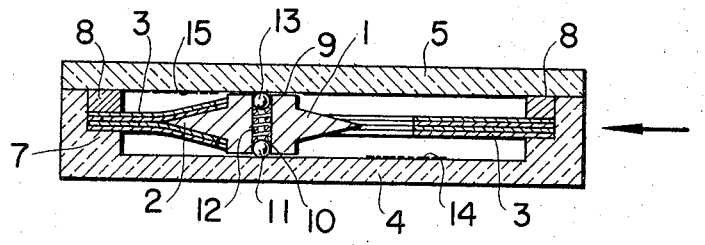
FIG. 4 is a central sectional view similar to FIG. 2, showing the device in a state after it has been subjected to an impact and has recorded the same.

If this vehicle should collide with some object in an unforeseen accident (or intentionally in a collision experiment), the weight disc 1 initially at the center of the device will function as an inertia reactor with respect to the collision impact and will be propelled in the direction of travel of the vehicle. Consequently, the sharp peripheral edge 2 of the weight disc 1 will drive forcibly into and along interfacial seam between the annular plates 3,3 on opposite sides thereof, which plates are thereby forced apart and plastically deflect as indicated in FIG. 4 as the disc 1 advances into the interfacial seam.

The weight disc 1 thus advances through a distance $l$ from its original central position O in the direction of travel of the vehicle, that is, opposite the direction of impact imparted to the vehicle, and stops. This distance $l$, which is a function of the maximum impact acceleration, can be measured directly after the collision. This measured distance $l$ is used in conjunction with a previously prepared graph as shown in FIG. 5, indicating the relationship between the weight disc displacement, $l$, and maximum impact acceleration, to determine the maximum impact acceleration of the collision.

While the displacement distance $l$ can be measured directly as described above in instances of single collisions, there may be instances where secondary and even further collisions occur subsequently to move the weight disc 1 to a position other than the position corresponding to the distance $l$ and the maximum impact acceleration.

In such cases, the provision of the steel balls 11 and 13 disposed within the weight disc 1 and urged outward by the spring 12 against the case 4 and cover plate 5 affords great convenience in that these steel balls operate as styluses to inscribe a trace 16, directly indicating the path of movement of the weight disc, in the paint layers 14 and 15 on the inner surfaces and thereby to leave a record of this movement. Accordingly, this record can be observed through the transparent case and cover plate 4 and 5, and the distance $l$ from the original disc position O to the outer end 17 of the trace 16 can be measured from the outside without the necessity of opening the cover plate 5.

In the case where the impact acceleration acts in a direction which is inclined relative to the planar direction of the device, one of the steel balls 11 and 13 may temporarily separate from the inner surface of the case 4 or cover plate 5, in which case the above mentioned record is not completely inscribed and is thereby interrupted. However, the other steel ball, without fail, is pressed firmly with increased force against its corresponding recording surface, whereby there can never be an instance wherein the trace 16 is not inscribed on either of the inner surfaces of the case 4 and cover plate 5. That is, the shift distance $l$ of the weight disc 1 can be measured from the inscribed trace 16 remaining on at least one of the ink-coated surfaces and, moreover, can be reproduced.

Another important feature of this invention is that the inscribed trace 16 indicates the direction of the impact acceleration. Therefore, if the trace 16 is found to be substantially in the direction of travel of the vehicle after a collision, that is, in the direction of arrow mark 6, it may be surmised that the vehicle collided head on with the other object. On the other hand, if the trace 16 is found to be in the opposite direction, it may be surmised that the vehicle was bumped from the rear.

Furthermore, if the position of the weight disc or the direction of the trace 16 is oblique or inclined relative to the front-to-rear direction of the vehicle, this will mean that impact was imparted obliquely to the vehicle. That is, the angle between the front-to-rear axis of the device and the trace 16 will indicate the angle between the front-to-rear direction of the vehicle and the collision direction.

As stated hereinbefore, a graph such as that shown in FIG. 5 is necessary for determining maximum impact accelerations from measured values of the distance $l$. This graph can be drawn to show average measured values indicating the relationship between the distance $l$ and the maximum impact acceleration as determined from the results of experiments carried out with a separate impact tester and several devices of the same specification as a device involved in a collision. It has been found that remarkably consistant and accurate results can be obtained as indicated in FIG. 5, which is based on actual experimental results.

Specification values such as the weight of the weight disc 1 and the material, thickness, and number of the plastic annular plates are selected in accordance with the required range of impact acceleration.

Although not shown in the drawings, concentric circles radially spaced one millimeter apart and having their common center at the center of the device can be inscribed on the case 4 and cover plate 5 for simple direct reading of the distance $l$. Furthermore, in the case where measurement of impact acceleration due to a two-dimensional collision is insufficient, two of the devices of this invention can be used in a combined arrangement as indicated in FIG. 6, in which the two devices lie in mutually perpendicular planes. A collision resulting in three-dimensional impact acceleration can then be recorded.

The results of experiments with prototypes of the impact acceleration recording device of this invention indicate that, with the use of a device in which two annular plates 3,3 made of annealed aluminum of 0.15-mm, thickness and wieght disc 1 of 10-gram weight are used, the weight disc 1 shifts 1 mm per impact acceleration of 10G, and a maximum acceleration of 80G can be measured corresponding to a displacement of 8 mm of the weight disc with an accuracy of ± 5G. Each recording device used in these experiments had an overall diameter of 52 mm, an overall thickness of 10 mm, and a total weight of 25 grams.

It was found further that there is no displacement whatsoever of the weight disc with respect to vibration or impact of a magnitude of 10G or less because of friction of the annular aluminum plates. Accordingly, the zero point or original setting of the device cannot be disturbed by ordinary handling and transportation.

While this invention has been described above with respect to one specific example thereof, it will be apparent that various modifications can be made therein. For example, while the case 4 and cover plate 5 are of circular shape in planar view in the above described example, they can be made to have a square peripheral shape.

Thus, as is apparent from the foregoing disclosure, the impact acceleration recording device of this invention fully achieves the aforestated objects thereof.

What is claimed is:

1. An impact acceleration recording device comprising a circular weight disc constituting an inertia reactor and having a sharp peripheral edge of wedge shape in section passing through the disc axis, at least two thin plates made of a plastic material and disposed with an interfacial seam therebetween, said plates clamping from opposite sides the peripheral edge of said weight disc and holding the weight disc in an original position within the plates; and a case fixedly holding the outer edge portions of the plates and enclosing the plates and the weight disc, the weight disc responding to impact acceleration component imparted to the case in a direction parallel to the plates to shift from said original position to an indication position displaced therefrom as the peripheral edge thereof forceably advances into and along said interfacial seam, deforming the plates apart with the distance between the original and displaced positions being indicative of the magnitude of the impact acceleration component.

2. The impact acceleration recording device according to claim 1, in which recording means are provided for recording a trace of the path travelled by the weight disc.

3. The impact acceleration recording device according to claim 2, in which the case further includes at least one transparent wall overlying one of the plates, said one plate having an opening therein, the weight disc being initially centered within said opening, the inner surface of said one wall being coated with an inscribable layer, and recording means comprising said inscribable layer and stylus means mounted on the weight disc and in contact with said inscribable layer to inscribe said trace of movement of said weight disc thereon.

4. The impact acceleration recording device according to claim 1, further comprising a reference directional mark provided on the outer surface of the case for indicating the installed orientation of the device.

5. The impact acceleration recording device as claimed in claim 1, wherein said plates are annular in form and are disposed in mutually coaxial laminated state with the circular inner edges of said plates clamping the peripheral edge of the weight disc from the opposite side.

6. The impact acceleration recording device according to claim 5, in which a total of four annular plates are involved, two on each side of the weight disc.

7. The impact acceleration recording device according to claim 5, in which the annular plates are made of annelaed aluminum sheet material.

8. The impact acceleration recording device according to claim 5, in which recording means are provided for recording a trace of the path travelled by the weight disc.

9. The impact acceleration recording device according to claim 8, in which the case is provided with at least one transparent wall extending parallel to the weight disc and overlying one of said annular plates, the inner surface of said transparent wall being coated with an inscribable layer and stylus means mounted on the weight disc and in contact with said inscribable layer to record the trace of movement of said disc with respect to said two thin annular plates supporting the same.

10. The impact acceleration recording device according to claim 9 in which an opening is provided in the center of said disc and a spring biased ball projects outwardly therefrom to form said stylus means.

* * * * *